(12) United States Patent
Brady

(10) Patent No.: US 9,832,341 B1
(45) Date of Patent: Nov. 28, 2017

(54) METHOD FOR EXECUTING AN IMAGING DATA REQUEST FROM A MOBILE DEVICE TO AN IMAGE PROCESSING APPARATUS USING A PUBLIC AND PRIVATE NETWORK

(71) Applicant: CANON KABUSHIKI KAISHA, Tokyo (JP)

(72) Inventor: Nigel Brady, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/296,486

(22) Filed: Oct. 18, 2016

(51) Int. Cl.
| | |
|---|---|
| *H04N 1/327* | (2006.01) |
| *H04N 1/32* | (2006.01) |
| *H04N 1/44* | (2006.01) |
| *H04N 1/00* | (2006.01) |

(52) U.S. Cl.
CPC ..... *H04N 1/32776* (2013.01); *H04N 1/00315* (2013.01); *H04N 1/32106* (2013.01); *H04N 1/32523* (2013.01); *H04N 1/4433* (2013.01); *H04N 2201/006* (2013.01); *H04N 2201/0039* (2013.01); *H04N 2201/0055* (2013.01); *H04N 2201/0094* (2013.01); *H04N 2201/3208* (2013.01)

(58) Field of Classification Search
USPC ...................................................... 358/1.15
See application file for complete search history.

(56) References Cited

U.S. PATENT DOCUMENTS

| | | | |
|---|---|---|---|
| 9,451,128 B2 | 9/2016 | Ferreira et al. | |
| 2015/0092233 A1* | 4/2015 | Park et al. | G06F 3/1288 358/1.15 |
| 2015/0355873 A1* | 12/2015 | Choi | G06F 3/1204 358/1.15 |

* cited by examiner

*Primary Examiner* — Ngon Nguyen
(74) *Attorney, Agent, or Firm* — Canon USA, Inc. I.P. Division

(57) ABSTRACT

A mobile data processing method, in which a request for performing an imaging data request by an image processing apparatus is initiated from a user of a mobile device. The method includes receiving first information generated by an image processing apparatus and second information generated by the mobile device. The first information and the second information are received by an information processing apparatus via a public network. The first and second information are stored in association with each other. The method continues by determining if a print job was received with the first information and the second information. The method may conclude by transmitting the imaging data request to the image processing apparatus from the information processing apparatus via a private network in response to determining that the imaging data request was received with the first information and the second information.

16 Claims, 5 Drawing Sheets

METHOD FOR EXECUTING AN IMAGING DATA REQUEST FROM A MOBILE DEVICE TO AN IMAGE PROCESSING APPARATUS USING A PUBLIC AND PRIVATE NETWORK

BACKGROUND

Field of the Disclosure

The present disclosure relates in general to a method for executing an imaging data request from a mobile device to an image processing apparatus using a public and private network, and more particularly, to a mobile printing application allowing a user of a mobile device to direct a print request to a desired image processing apparatus without configuring network settings.

Description of the Related Art

Mobile devices are increasingly being used for transferring print or scan jobs to the same network image processing apparatuses that desktop computers can access. These mobile devices include by way of example smartphones, computing tablets, laptops or cameras that are often used to store images and documents. It may be preferable to execute an imaging data request such as printing or scanning directly from the mobile device instead of executing the imaging request from a desktop.

In a workplace environment a plurality of image processing apparatuses such as a multifunction peripheral (MFP), printer, scanner, copier and facsimile are typically connected to a private network. It is useful to provide access to a user for executing an imaging data request from the mobile device to the plurality of image processing apparatuses on the private network. However, in the application of exchanging data, images, documents, or information with an image processing apparatus, mobile devices generally have no secured association with the domain in which the image processing apparatus is located. The lack of secured association between the mobile device and the image processing apparatus makes it difficult to control access to the image processing apparatus in an environment where security and tracking of device resource usage are required.

There exist mobile print and scanning solutions for allowing mobile devices to print and scan from an image processing apparatus on a private network. One such solution allows mobile users to connect directly to an image processing apparatus on the network, allowing the user to print and scan from the mobile devices. However, there exist a few issues with the current printing solutions. One such issue includes requiring additional configuration steps by the user on the mobile device in order to enable a direct connection from the mobile device to an image processing apparatus the user would like to use for printing or scanning. For example, a user's mobile device may be required to join the same network in which the image processing apparatus is connected to. This may require the user to connect to a Wi-Fi network, but such a network may not always be available in an office environment. Even if such a network is available, the user must take the additional step of changing the network settings associated with the user's mobile device every time the user would like to execute an imaging data request.

Alternatively, the image processing apparatuses may be exposed to the public internet. However, this presents a security risk, as many of these image processing apparatuses, though possessing network capabilities are not designed to be secure in a public internet environment. The image processing apparatuses embedded operating systems may contain vulnerabilities that could compromise an entire corporate network.

Another solution utilizes cloud computing that allow the use of e-mail to send files from a mobile device to a target image processing apparatus such as a printing device. However, using an e-mail system to relay files to and from an image processing apparatus may also cause unwanted issues. For example, e-mail is not always a reliable delivery system, and some messages may be lost. Additionally, if image processing apparatuses are exposed over an e-mail system, there is a risk of unauthorized messages from spammers being sent to the connected image processing apparatuses, causing them to print erroneously, and waste consumable resources such as paper and toner. Thus, there is a need in the art for a method of transferring imaging data requests from a mobile device to a plurality of image processing apparatuses on a private network without requiring a user of the mobile device to join the private network.

SUMMARY

The present disclosure is directed to a method for transmitting an imaging data request from a mobile device to an image processing apparatus. The method includes using a public network for communications between the mobile device and an information processing apparatus without requiring any prior network configuration on the mobile device. The information processing apparatus is pre-configured to communicate with any image processing apparatus reachable via a private network. The information processing apparatus forwards the imaging data request received via the public network to the image processing apparatus via the private network. Thus, the mobile device may transmit an imaging data request such as a print job to a target image processing apparatus connected to the private network without requiring the user of the mobile device to configure network settings for the public network and the private network.

According to an aspect of the present disclosure, a mobile data processing method is provided. The mobile data processing method includes receiving from a mobile device first information generated by an image processing apparatus and second information generated by the mobile device. The first information and the second information is then received by an information processing apparatus via a public network. The first information and the second information are stored in association with each other on the image processing apparatus. The method may continue with determining if an imaging data request was received with the first information and the second information. The method may conclude by transmitting the imaging data request from the information processing apparatus to the image processing apparatus via a private network in response to determining that the imaging data request was received with the first information and the second information.

Further features of the present disclosure will become apparent from the following description of exemplary embodiments with reference to the attached drawings.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the devices, systems, and methods described herein.

In an environment with a plurality of image processing apparatuses on the same private network, a user may execute an imaging data request such as a print job from a desktop computer connected to that same network. If the user has a mobile device, the mobile device may be used to execute a print job, a scan job or any other imaging data request. However, to directly execute a print job from a mobile device to a targeted image processing apparatus from the plurality of image processing apparatuses, the mobile device and the image processing apparatus must be on the same network. Requiring the mobile device to be on the same network as the targeted image processing apparatus may present hurdles to connection for the user such as requiring a direct 4G or Wide Area Network (WAN) connection that may be blocked by a firewall or IT policies in a workplace environment.

Opening a firewall for a mobile device is also a security risk. Thus, the mobile device must be configured by the user. Furthermore, the user's mobile device needs to be registered with the image processing apparatus. If the user wants access to every image processing apparatus on the network, the user must repeatedly register the mobile device for each image processing apparatus.

The present disclosure overcomes the above described issues by not requiring the mobile device and the image processing apparatus to be on the same private network. The mobile device according to the present disclosure does not need to be registered with any of the image processing apparatuses to execute an imaging data request.

Figure 1:
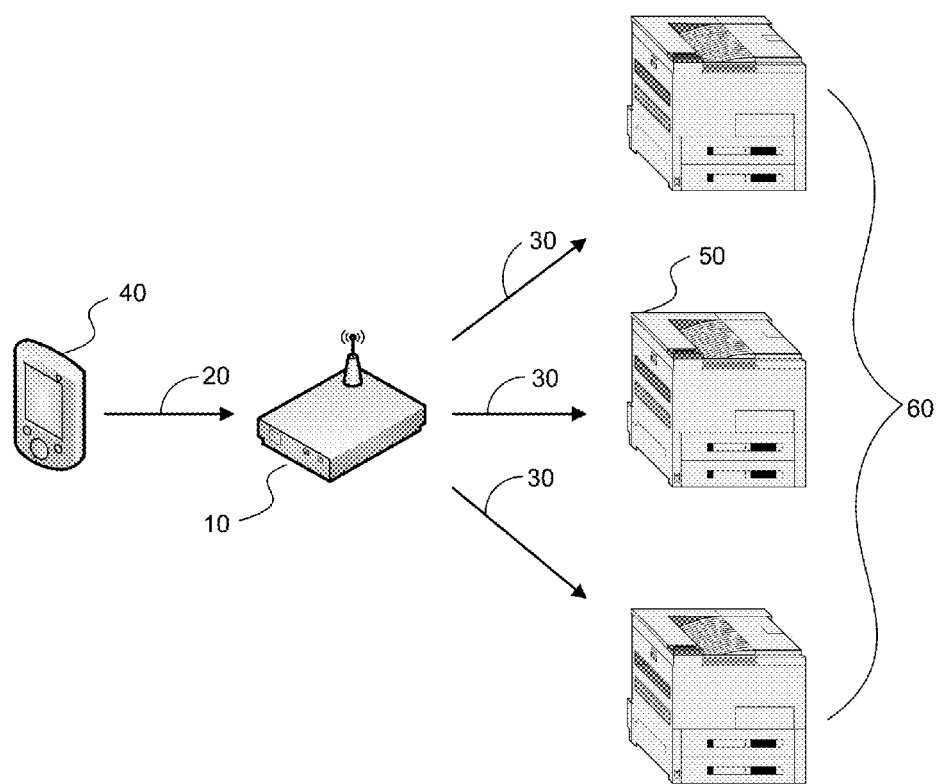
FIG. 1 is a schematic drawing showing an embodiment of a system structure for performing mobile printing.

FIG. 1 is a schematic drawing illustrating an embodiment of a system structure for sending an imaging data request from a mobile device to an image processing apparatus. FIG. 1 includes an information processing apparatus 10. The information processing apparatus 10 is connected to a public network 20 and a private network 30. The public network 20 is a proximity network.

A proximity network may be any wireless technology standard for exchanging data over short distances from fixed and mobile devices. The advantage of using a proximity network as the public network 20 for communications between a mobile device 40 and the information processing apparatus 10 include not requiring a user of the mobile device 40 to configure network settings, such as 4G or Wi-Fi access, and no other technical network settings need to be set on the mobile device 40. The mobile device 40 merely requires the ability to connect to the proximity network when it is within range of a wireless signal.

The proximity network is a network that establishes a wireless connection between the mobile device 40 and the information processing apparatus 10 when the mobile device 40 is within a predetermined distance from the information processing apparatus 10. If the mobile device 40 is not within the predetermined distance from the information processing apparatus 10, no connection is established. Some advantages to using a proximity network include the ability to receive data from nearby devices simply by being within range of the wireless signal, requiring no prior network configuration and a natural security measure. The distance-based attenuation of the signal will form a natural physical boundary beyond which mobile device users will not be able to execute an imaging data request.

In one embodiment of the present disclosure, the public network 20 is a Bluetooth Low Energy network. This is by way of example and not intended to limit the type of proximity networks that may be used to establish a connection between the mobile device 40 and the information processing apparatus 10. For purposes of discussion the public network 20 will be described interchangeably with Bluetooth Low Energy network throughout the Specification.

The private network 30 is a secure network in which the information processing apparatus 10 may communicate with a plurality of image processing apparatuses 60. The information processing apparatus 10 is configured to identify every image processing apparatus on the private network 30 with a unique device-specific name. The information processing apparatus 10 associates the device-specific name with the image processing apparatus's network IP address. The information processing apparatus 10 is also configured to broadcast the names of available image processing apparatuses 60 to the mobile device 40 via the public network 20. In other words, the information processing apparatus 10 operates as a relay between the mobile device 40 and a fleet of image processing apparatuses 60, switching between the public network 20 and the private network 30 depending on whether the information processing apparatus 10 is communicating with an image processing apparatus 50 or a mobile device 40.

Still referring to FIG. 1, the information processing apparatus 10 communicates with the image processing apparatus 50 via the private network 30. The private network 30 may be a traditional network such as Wi-Fi or Ethernet by way of example. Because the private network 30 may be a Wi-Fi network, the information processing apparatus 10 is pre-configured by a system administrator with the network information to connect to the private network 30 in order to communicate with the image processing apparatus 50 or the fleet of image processing apparatuses 60. Because the information processing apparatus 10 is pre-configured with the network information to connect to the private network 30, no changes to the private network 30 are necessary.

The image processing apparatus 50 is configured to execute an imaging data request such as a print or scan job by way of example. The image processing apparatus 50 may include the following devices by way of example: a printer, a scanner, a copier, a facsimile, or a multi-functional peripheral device (MFP). For purposes of discussion the image processing apparatus 50 and the term MFP are used interchangeably throughout the Specification. The image processing apparatus 50 may include image processing functions such as a print function, a scan function, a copy function, and a facsimile function. The image processing apparatus 50 may include a display configured to display data and/or images. The display may include a user interface allowing the user to input information or commands to the image processing apparatus 50. For example, the display may include a touch panel and/or soft keyboard such that the user can input information or commands. The display may also be associated with separate input devices such as a keyboard, a mouse, and/or other voice or optical input devices.

Some examples of mobile devices to send an imaging data request include a computing tablet, a mobile phone, a laptop and a digital camera. Any mobile device that is able to establish a connection with the information processing apparatus 10 via the public network 20 may be used.

Figure 2:
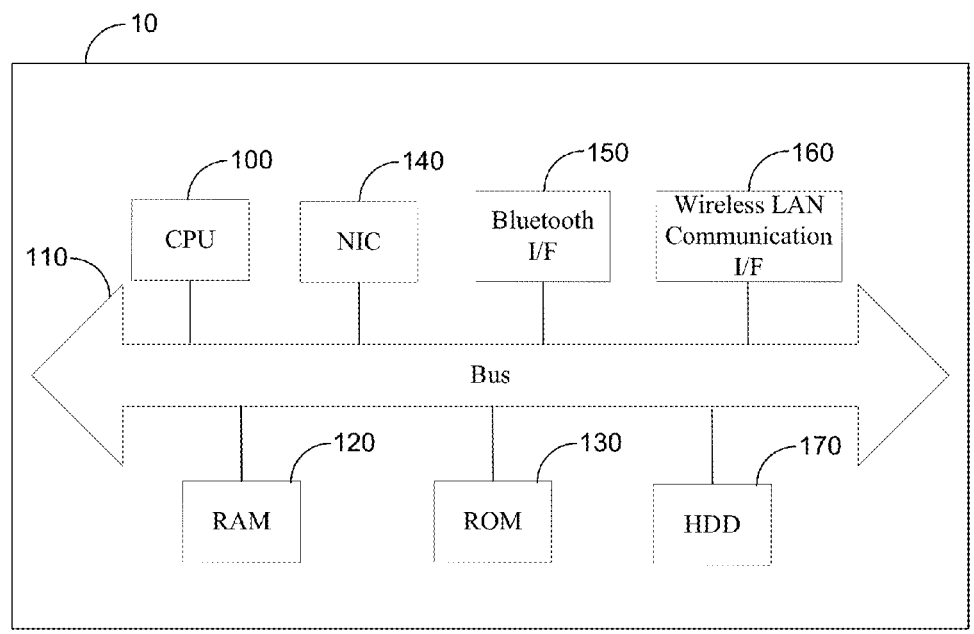
FIG. 2 shows an exemplary block diagram of the information processing apparatus.

FIG. 2 is a diagram that illustrates an example of the hardware configuration of the information processing apparatus 10. The information processing apparatus 10 includes at least one processor (CPU) 100, which executes programs stored in a ROM 130 or, for example, in a hard disk drive (HDD) 170. The CPU 100 centrally controls each of devices connected to a system bus 110.

A RAM 120 functions as the main memory, work area, etc. of the CPU 100. A network interface controller (NIC) 140 exchanges data with other network equipment or a file server, etc. via a network bi-directionally. A wireless LAN communication I/F 160 is connected to the network via an access point for bidirectional data exchange with other network equipment. The HDD 170 may be used as a place for temporary storage of images in certain instances. The information processing apparatus 10 includes a Bluetooth I/F 150. The CPU 100 performs processing on the basis of programs stored in the ROM 130 or the HDD 170. By this means, the functions of the information processing apparatus 10 are realized.

The memory may include one or more computer-readable or computer-writable storage media. A computer-readable storage medium, as opposed to mere transitory, propagating signals, includes a tangible article of manufacture, for example, a magnetic disk (for example, a floppy disk, a hard disk), an optical disc (for example, a CD, a DVD, a Blue-ray), a magneto-optical disk, magnetic tape, or semiconductor memory (for example, a non-volatile memory, flash memory, a solid-state drive, SRAM, DRAM, EPROM, EEPROM).

The memory is configured to store computer-readable data or computer-executable instructions. The memory may also be configured to store association entries of the users, the imaging data requests, and the information of the mobile devices. In an alternate embodiment, the computer readable/writable instructions and the various entries may be stored in different memory or storage units.

The NIC 140, Bluetooth I/F 150 and Wireless LAN Communication I/F 160 are configured to establish a communication between the information processing apparatus 10 with other network devices or another multiple function device.

Similar to the information processing apparatus 10, the mobile device 40—and the image processing apparatuses 60 may include a CPU, a memory, an I/O interface, a network interface, a Bluetooth I/F, a Wireless LAN Communication I/F, a HDD, and a bus with similar or the same functions as those described in FIG. 2. The illustrations of the same structures are not repeated in another drawing.

Figure 3:
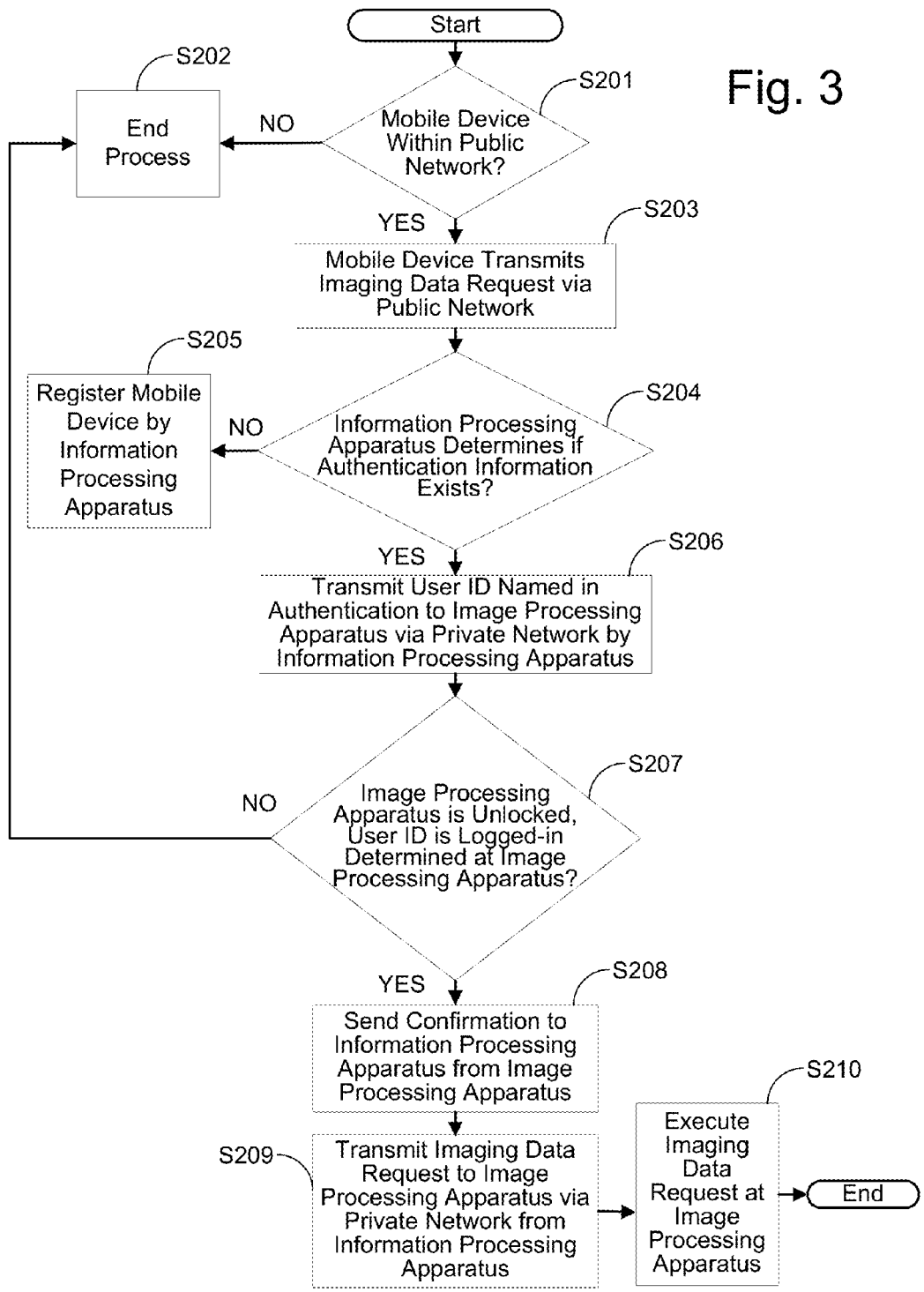
FIG. 3 is a flow chart illustrating a process for transmitting an imaging data request from a mobile device to an image processing apparatus.

FIG. 3 is a flow chart illustrating a process for executing an imaging data request such as a print job from the mobile device 40 on a user selected image processing apparatus 50. In the present disclosure a private network administrator restricts mobile printing or scanning to authorized users of the private network 30. The process begins by determining whether the mobile device 40 is within range of the public network 20 according to step S201. If it is determined that the mobile device 40 is not within the public network 20, the process ends at step S202 without executing the imaging data request and the user is alerted that they must be within the public network. Alternatively, if it is determined in step S201 that the mobile device 40 is within the Bluetooth Low Energy network, the process continues with step S203.

In step S203, the mobile device 40 transmits an imaging data request to the information processing apparatus 10 along with authentication information. The authentication information is information that is generated during a mobile device registration process that is described in further detail below with reference to FIG. 4. The mobile device 40 transmits the imaging data request and the authentication information via the public network to the information processing apparatus 10. In one embodiment the authentication information may include a random number generated by an image processing apparatus as well as a unique identifier generated by a mobile device.

Upon receiving the imaging data request and the authentication information from the mobile device 40 in step S203, the information processing apparatus 10 verifies that the authentication information exists in the memory of the information processing apparatus 10 in S204. The authentication information exists in the memory in a case where the mobile device 40 has completed a registration process with the information processing apparatus 10 as described below in FIG. 4. If the authentication information does not exist in the memory of the information processing apparatus 10, the process proceeds with step S205 of starting the process to register the mobile device with the information processing apparatus 10. If the authentication information does exist in the memory of the information processing apparatus 10, a user identification associated with the authentication information stored in the memory is transmitted to the image processing apparatus 50 via the private network 30 in S206.

Upon receiving the user identification from the information processing apparatus 10 via the private network 30, the image processing apparatus 50 determines whether a user identification used to unlock and log into the image processing apparatus 50 matches the user identification received from the information processing apparatus 10 via the private network 30 as shown in step S207. If is determined that the user identification used to log into the image processing apparatus 50 does not match the user identification received by the image processing apparatus 50, the process ends without execution of the imaging data request. Also, the user may be prompted to unlock the image processing apparatus 50 to continue executing their job.

On the other hand, if the image processing apparatus 50 has been unlocked and the user identification that is logged into the image processing apparatus 50 matches the received user identification, the process proceeds by transmitting a confirmation to the information processing apparatus 10 via the private network 30 as shown in step S208.

A user may log into the image processing apparatus 50 in several ways. The user may input user identification (UID) information through a user interface of a display on the image processing apparatus 50. In one embodiment, the image processing apparatus 50 may include a card reader configured to read data content, for example, UID information recorded on a medium such as a smart card or a proximity card. The image processing apparatus 50 may also include other devices allowing the user to log in through inputs of UID, biometrics or other information. The input user information such as the UID and biometrics information are then verified by the image processing apparatus 50 to ensure that the user is authorized to access the image processing apparatus 50.

Next in step S209, the information processing apparatus 10 transmits the imaging data request requested by the mobile device 40. The imaging data request is transmitted from the information processing apparatus 10 to the image processing apparatus 50 using the private network 30. Next, the image processing apparatus 50 executes the imaging data request in step S210. The image processing apparatus 50 may also be configured to send a status update regarding the execution of the imaging data request to the information processing apparatus 10 via the private network 30 which is then relayed to the mobile device 40 via the public network 20.

The processing of the present embodiment allows a user with a mobile device 40 that is within wireless range of the public network 20 or Bluetooth Low Energy network, to transmit an imaging data request to a desired image processing apparatus from a fleet of image processing apparatuses 60. The imaging data request is sent to the desired image processing apparatus 50 without requiring the user to configure network settings or require that the mobile device 40 be on a 4G network or Wi-Fi. No firewall, port forwarding, Network Access Translation (NAT), or other technical network settings will need to be set on the mobile device 40. Furthermore, because the information processing apparatus 10 is pre-configured with network settings associated with the private network 30, no changes are necessary to the private network 30 to allow for communications between the information processing apparatus 10 and any one of the image processing apparatuses 60 associated with the private network 30. Thus, the mobile device 40 does not need to connect to the any of the image processing apparatuses 60 in order for an imaging data request to be executed on one of the image processing apparatuses 60 selected by the user of the mobile device 40.

Another advantage is that no servers or image processing apparatuses need to be exposed to the public internet which reduces the chance that an unauthorized user will use the image processing apparatus as a vector for an attack. Also the present disclosure may operate on existing MFP user authentication infrastructure such as smart cards, login applications and login terminals. No changes are necessary to an existing fleet of MFP's on a network. The present disclosure includes an information processing apparatus that may identify every image processing apparatus in a fleet of image processing apparatuses with a unique, device-specific name, associate the device-specific name with the image processing apparatus's network (IP) address and broadcast the names of available image processing apparatuses to a mobile device via a Bluetooth Low Energy network.

The present disclosure includes receiving a device information query from the mobile device, addressed to an image processing apparatus identified by the device-specific name. The information processing apparatus forwards the device information query from the mobile device to the target image processing apparatus, from the Bluetooth Low Energy network to a private network. The information processing apparatus is also configured to receive a device information query response from the target image processing apparatus and forward it to the mobile device, from the private network to the Bluetooth Low Energy network. The information processing apparatus is configured to receive print job requests and scan job requests from the mobile device and forward it to the target image processing apparatus, as well as receive scan request status updates and print job status updates from the target image processing apparatus and relaying it to the mobile device. Furthermore, the information processing apparatus 10 may associate a user of the mobile device with an authorized user of a private network, before allowing the sending/receiving of imaging data requests to and from the mobile device and the image processing apparatus. The information processing apparatus may also verify that an authorized user is logged into an image processing apparatus, before allowing the sending/receiving of messages to and from the image processing apparatus.

The process with reference to FIG. 3 refers to executing an imaging data request from the mobile device 40. It is important to note that an imaging data request may include a print job, a scan request from the mobile device 40, a print job status update request and a scan request status update. The information processing apparatus 10 is also configured to receive status updates from the image processing apparatus 50 via a private network 30 and relay the status updates to the mobile device 40 via the public network 20.

Figure 4:
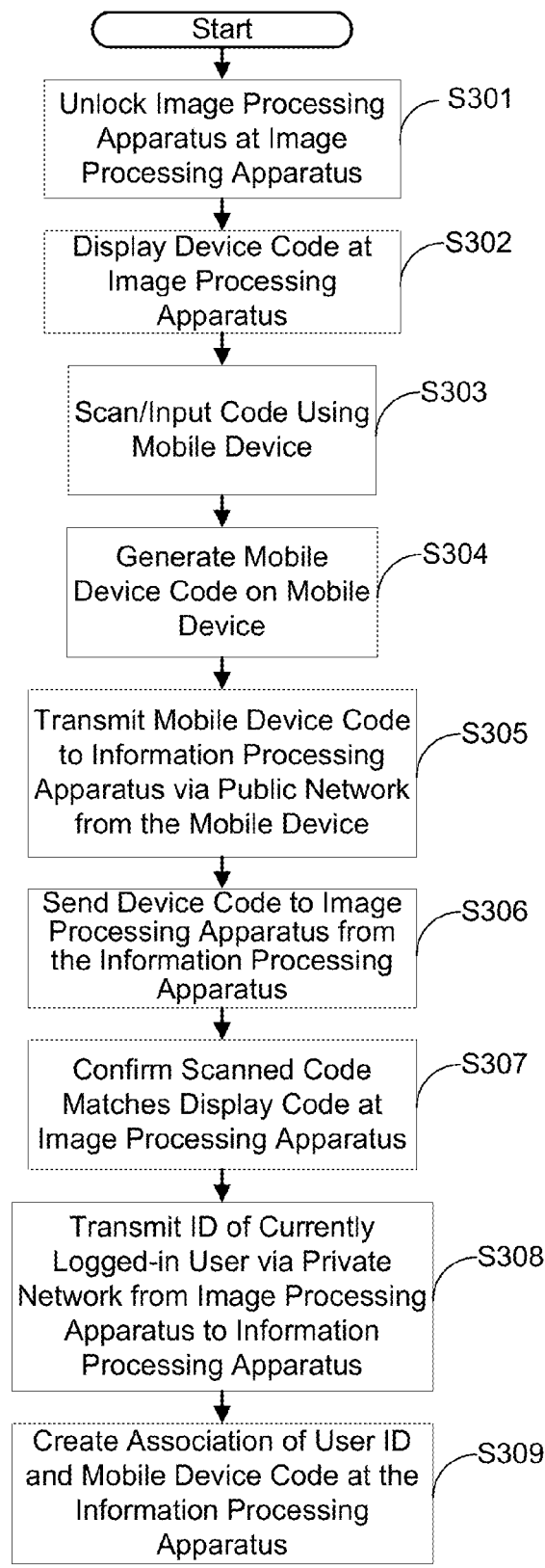
FIG. 4 is a flow chart illustrating a process for associating a mobile device with an information processing apparatus.

FIG. 4 is a flowchart illustrating a device registration process in accordance with the present disclosure. The registration process may proceed when the information processing apparatus 10 determines that the authentication information received from the mobile device 40 does not match the authentication information stored in the memory of the information processing apparatus 10 according to step S205 in FIG. 3, or when the mobile device does not possess authentication information at all.

The registration process results in the mobile device 40 being registered with the information processing apparatus 10. Since the mobile device 40 only communicates with the information processing apparatus 10 to execute an imaging data request, once the mobile device 40 is registered with the information processing apparatus 10 it is not necessary to register again even when the target image processing apparatus selected to execute the imaging data request changes to a different image processing apparatus from the fleet of image processing apparatuses 60 on the private network 30. Furthermore, because the information processing apparatus 10 is pre-configured to communicate with any image processing apparatus on the private network 30, the mobile device 40 may request a print job to be executed by any of the image processing apparatuses on the private network 30 without registering the mobile device 40 with any additional image processing apparatuses 60 on the private network 30.

The registration process initiates with step S301 when a user unlocks a desired image processing apparatus to be used for executing an imaging data request. The user may unlock an image processing apparatus by logging in at the apparatus. The user may input user identification (UID) information through a user interface of a display. In one embodiment, the targeted image processing apparatus may include a card reader configured to read data content, for example, UID information recorded on a medium such as a smart card or a proximity card. The targeted image processing apparatus may also include other devices allowing the user to log in through inputs of UID, passwords, biometrics or other information. The input user information such as the UID and biometrics information are then verified by the image processing apparatus to ensure that the user is authorized to access the targeted image processing apparatus.

Once the user is authenticated through the log-in process in step S301, a device code is generated by the targeted image processing apparatus in step S302. The device code may be displayed on the display of the targeted image processing apparatus. The device code may include an authentication token and an IP address of the targeted image processing apparatus. The authentication token may be a random number. The device code may also include a device name for the image processing apparatus 50. The device name may also be used instead of the IP address of the image processing apparatus 50. In one embodiment of the present disclosure the device code displayed by the image processing apparatus 50 is a Quick Response (QR) code. The QR code may include a random number (authentication token) as well as a device name. In this exemplary embodiment the QR code includes a random number and a device name.

Subsequently, step S303 may involve a user of the mobile device 40 scanning the QR code. A mobile application stored on the mobile device 40 may be used to scan the QR code. Alternatively, the user may manually input the device code displayed by the image processing apparatus 50. The mobile device 40 can capture the image of the device code via a built-in camera or a scanner. In one embodiment, the device code generated by the image processing apparatus 50 can be obtained by the mobile device 40 via email communication. In an alternative embodiment, an external image capturing device may be used to capture the image of the device code; and then transmit the captured image to the mobile device 40. In another alternate embodiment, the device code may be displayed at the image processing apparatus 50 and entered into the mobile device 40 by the user. In another embodiment, the code may be transferred from the MFP to the mobile device 40 via Near-Field Communication (NFC).

Upon scanning or inputting of the displayed code in step S303, the registration process continues with step S304 of generating a device code associated with the mobile device 40. In one embodiment of the present disclosure the device code associated with the mobile device is a universally unique identifier (UUID) such as a random password. Next, in step S305 the mobile application associated with the mobile device 40 transmits the device code generated by the image processing apparatus as well as the mobile device code generated by the mobile device 40. These may include the random number, the device name and the UUID that are then transmitted to the information processing apparatus 10 via the public network 20. In step S306 the process continues with the information processing apparatus 10 transmitting at least a portion of the device code generated by the image processing apparatus 50 to the image processing apparatus 50 via the private network 30. The portion of the device code may include the random number. Upon receiving the portion of the device code via the private network 30, the image processing apparatus confirms in step S307 that the received portion of the device code, the random number matches the random number that was displayed by the image processing apparatus when the user unlocked the image processing apparatus in step S301.

In step S308, the image processing apparatus 50 sends a user identification of the currently logged-in user via the private network 30 to the information processing apparatus 10. Next in step S309 the information processing apparatus 10 creates an association between the received user identification, the device code generated by the image processing apparatus 50 and the device code generated by the mobile device 40. The association is stored in the memory of the information processing apparatus 10 as authentication information.

If an association between the user identification and the corresponding random number and identifier are stored in the memory of the information processing apparatus 10, a second registration process for the mobile device 10 is not necessary. When the user of the mobile device 40 wants to execute an imaging data request on the image processing apparatus 50 associated with the private network 30, the information processing apparatus 10 merely has to verify that that the user identification of the user of the mobile device 40 matches the authentication information stored in the memory of the information processing apparatus 10. Furthermore, once the user of the mobile device 40 is registered, the user may use other image processing apparatuses associated with the private network 30 without registering again.

Figure 5:
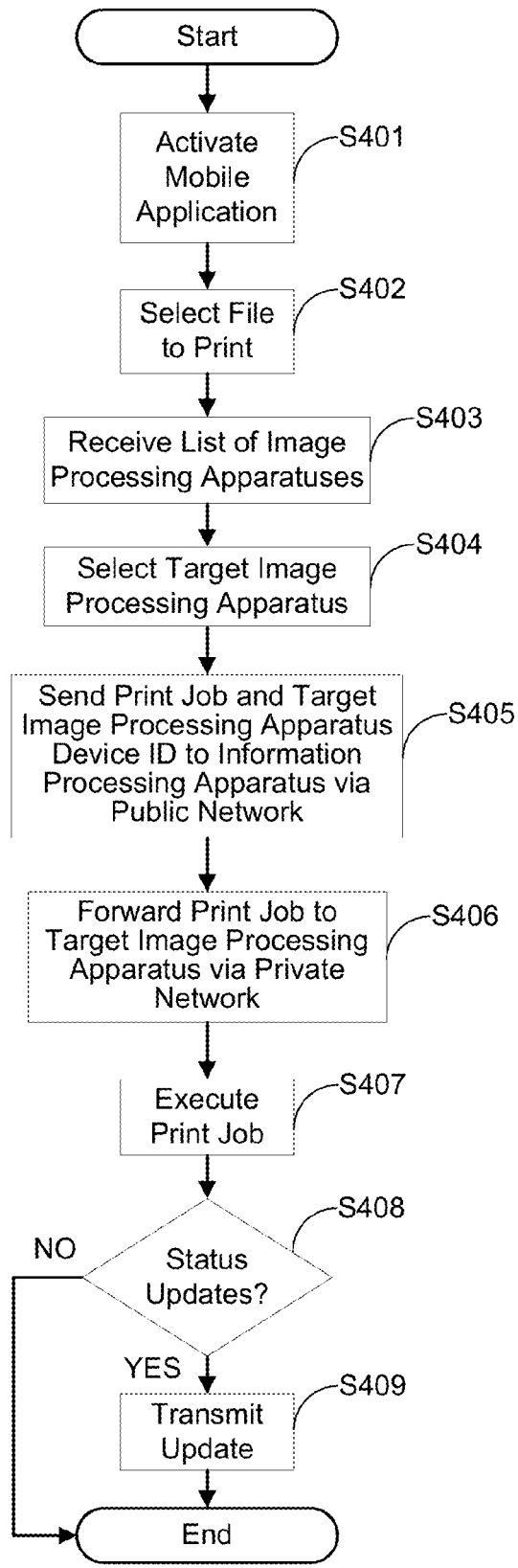
FIG. 5 is a flow chart illustrating a process for transmitting an imaging data request from a mobile device to an image processing apparatus according to a second embodiment.

FIG. 5 is a flowchart which illustrates a second embodiment of the present invention for executing an imaging data request such as a print job when an administrator for the private network 30 permits anonymous users to print with their mobile devices. The process for executing the print job initiates in step S401 with a user activating a mobile application on the mobile device 40. Next in step S402, the user selects a file from the mobile device 40 to print. In step S403 the mobile device 40 receives a list of image processing apparatuses that can execute the selected print file from the information processing apparatus 10 via the public network 20. Thus, the mobile device 40 merely needs to be within range of the wireless signal of the public network 20 to know which image processing apparatuses the user may select to execute the print job.

In step S404, the user selects the target image processing apparatus from a list displayed on the mobile device 40 to execute the print file. Next in step S405, the mobile application sends the print file and the target image processing apparatus device identification, to the information processing apparatus 10 via the public network 20. The process continues with step S406, the information processing apparatus 10 sends the print file to the selected image processing apparatus via the private network 30. Upon receiving the print file, the selected image processing apparatus may execute the print job according to step S407. Following step S407, the selected image processing apparatus may forward print job updates to the information processing apparatus 10 via the private network 30 which is then transmitted to the mobile device 40 via the public network 20. Thus, the mobile device 40 may receive status updates regarding the print job such as paper jams or whether the print job has been completed by way of example.

The above described devices, systems, and methods can be implemented by supplying one or more computer-readable media having stored therein computer-executable instructions for realizing the above described operations to one or more computer devices that are configured to read the computer-executable instructions and execute them. In this case, the system or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium, for example, a magnetic disk including a floppy disk and a hard disk, an optical disc including a CD, a DVD, a Blue-ray disc, a magneto-optical disk, a magnetic tape, and a solid state memory such as a flash memory, a DRAM, an SRAM, a solid state drive can be employed as a computer-readable medium for the computer-executable instructions. The computer-executable instructions may be written to a computer-readable medium provided on a function extension board inserted into the device or on a function-extension unit connected to the device, and a CPU provided on the function-extension board or unit may implement the operations of the above-described embodiments.

While the above disclosure describes certain illustrative embodiments, the present disclosure is not limited to the above-described embodiments, and the following claims include various modifications and equivalent arrangements within their scope.

What is claimed is:

1. A mobile data processing method, comprising:
using an information processing apparatus having a memory and a processor coupled to the memory, the processor being configured to receive from a mobile device, an imaging data request, a code generated by an image processing apparatus and a mobile device code generated by the mobile device, the processor being configured to receive the imaging data request, the code and the mobile device code via a public network when the mobile device is within a predetermined distance from the information processing apparatus;
using the processor of the information processing apparatus to determine that the code and the mobile device code are stored in the information processing apparatus in association with a user identification; and
using the processor of the information processing apparatus to transmit the received imaging data request to the image processing apparatus via a private network in response to determining that the image processing apparatus has been logged into by a user having the user identification stored in the information processing apparatus, to execute the imaging data request on the image processing apparatus when the mobile device is within the predetermined distance from the information processing apparatus.

2. The method of claim 1, wherein the code generated by the image processing apparatus is displayed by the image processing apparatus when an authorized user is authenticated by the image processing apparatus.

3. The method of claim 1, wherein the mobile device code is generated by the mobile device in response to inputting the code generated by the image processing apparatus into the mobile device.

4. The method of claim 1, wherein the public network is a proximity network.

5. The method of claim 4, wherein the proximity network is a Bluetooth low energy network.

6. The method of claim 1, wherein the mobile device and the information processing apparatus establish a wireless connection without requiring a user of the mobile device to pre-configure network settings on the mobile device when the mobile device is within a predetermined distance from the information processing apparatus.

7. The method of claim 1, wherein the imaging data request includes a print job, a scan job, a facsimile job, or a copy job.

8. The method of claim 1, wherein if no imaging data request is received, the information processing apparatus initiates a registration process of the mobile device.

9. The method of claim 8, wherein the registration process further comprising:
logging into the image processing apparatus by the user;
displaying the code on the image processing apparatus in response to the user logging into the image processing apparatus;
inputting the code into the mobile device;
generating the mobile device code by the mobile device;
transmitting the code and the mobile device code from the mobile device to the information processing apparatus via the public network;
transmitting the code from the information processing apparatus to the image processing apparatus via the private network;
determining whether the code transmitted to the image processing apparatus via the private network matches the code displayed by the image processing apparatus;
transmitting the user identification of the user that logged into the image processing apparatus in response to determining that the code transmitted to the image processing apparatus matches the code displayed, from the image processing apparatus to the information processing apparatus via the private network; and
storing the user identification in the information processing apparatus with the code and the mobile device code.

10. The method according to claim 1, wherein the private network is a secured network.

11. The method according to claim 1, wherein the information processing apparatus is pre-configured with network settings to connect to a plurality of image processing apparatuses via the private network.

12. The method of claim 1, wherein the code is a random number and a device name.

13. The method of claim 1, wherein the mobile device code is a universally unique identifier.

14. An information processing apparatus, comprising:
a memory;
a processor coupled to the memory which executes the following:
receiving from a mobile device, an imaging data request, a code generated by an image processing apparatus and a mobile device code generated by the mobile device, the processor being configured to receive the imaging data request, the code and the mobile device code via a public network when the mobile device is within a predetermined distance from the information processing apparatus;
determining that the code and the mobile device code are stored in the information processing apparatus in association with a user identification; and
transmitting the received imaging data request to the image processing apparatus via a private network in response to determining that the image processing apparatus has been logged into by a user having the user identification stored in the information processing apparatus, to execute the imaging data request on the image processing apparatus when the mobile device is within the predetermined distance from the information processing apparatus.

15. A non-transitory computer-readable storage medium storing a program used by a computer to execute a mobile data processing method, the method comprising:
using an information processing apparatus having a memory and a processor coupled to the memory, the processor being configured to receive from a mobile device, an imaging data request, a code generated by an image processing apparatus and a mobile device code generated by the mobile device, the processor of the information processing apparatus being configured to receive the imaging data request, the code and the mobile device code via a public network when the mobile device is within a predetermined distance from the information processing apparatus;
using the processor of the information processing apparatus to determine that the code and the mobile device code are stored in the information processing apparatus in association with a user identification; and using the processor of the information processing apparatus to transmit the received imaging data request to the image processing apparatus via a private network in response to determining that the image processing apparatus has been logged into by a user having the user identification stored in the information processing apparatus, to execute the imaging data request on the image processing apparatus when the mobile device is within the predetermined distance from the information processing apparatus.

16. A mobile data processing method, comprising:

using an information processing apparatus having a memory and a processor coupled to the memory, the processor being configured to establish a wireless connection with a mobile device using a proximity network when the mobile device is within a predetermined distance from the information processing apparatus;

using the processor to receive an imaging data request from the mobile device to be executed on a selected image processing apparatus from a plurality of image processing apparatuses on a private network, wherein the imaging data request is transmitted via the proximity network; and using the processor to transmit the imaging data request from the information processing apparatus to the selected image processing apparatus via the private network in response to determining that the selected image processing apparatus has been logged into by a user having a user identification stored in the information processing apparatus, to execute the imaging data request on the selected image processing apparatus when the mobile device is within the predetermined distance from the information processing apparatus.

* * * * *